US00RE39442E

(19) United States
(12) Reissued Patent
Massey

(10) Patent Number: US RE39,442 E
(45) Date of Reissued Patent: Dec. 26, 2006

(54) ANIMAL CARCASS INCINERATOR

(75) Inventor: Sammy K. Massey, Camilla, GA (US)

(73) Assignee: Southern Breeze Fabricators, Inc., Camilla, GA (US)

(21) Appl. No.: 10/780,551

(22) Filed: Feb. 17, 2004

Related U.S. Patent Documents

Reissue of:
(64) Patent No.: 6,397,764
Issued: Jun. 4, 2002
Appl. No.: 09/951,810
Filed: Sep. 14, 2001

(51) Int. Cl.
*F23G 1/00* (2006.01)
*F23M 5/00* (2006.01)

(52) U.S. Cl. ..... 110/194; 110/248; 110/336
(58) Field of Classification Search ..... 110/208, 110/209, 310, 311, 312, 314, 322, 323, 194, 110/248, 336; 126/79, 69, 75, 500, 152 R, 126/163 R, 21 A; 432/249; 122/500, 18.3, 122/18.31, 152 B
See application file for complete search history.

(56) References Cited

U.S. PATENT DOCUMENTS

| | | | | | |
|---|---|---|---|---|---|
| 329,373 | A | * | 10/1885 | Detwiller | 432/200 |
| 1,771,850 | A | * | 7/1930 | Jacobus | 122/6 A |
| 2,288,028 | A | * | 6/1942 | Richardson | 126/99 R |
| 3,176,634 | A | | 4/1965 | Martin | |
| 3,177,827 | A | | 4/1965 | Melvin | |
| D210,722 | S | | 4/1968 | McDowell | |
| 3,508,505 | A | | 4/1970 | Gatewood | |
| 3,658,047 | A | * | 4/1972 | Happel | 126/21 A |
| 3,808,985 | A | | 5/1974 | Raber | |
| 3,896,745 | A | | 7/1975 | Mainka et al. | |
| 4,000,705 | A | * | 1/1977 | Raber | 110/194 |
| D261,801 | S | | 11/1981 | Johnson | |
| 4,433,523 | A | * | 2/1984 | Miedaner et al. | 52/591.4 |
| 4,441,481 | A | * | 4/1984 | Verhaegen | 126/522 |
| 4,628,898 | A | * | 12/1986 | von Conta | 126/58 |
| 4,757,756 | A | * | 7/1988 | Van Marr | 99/482 |
| D333,894 | S | | 3/1993 | Johnson | |
| 5,399,752 | A | | 3/1995 | Okrasinski et al. | |
| 5,699,745 | A | * | 12/1997 | Kaehr | 110/194 |
| 5,799,597 | A | * | 9/1998 | Kaehr | 110/346 |
| 5,926,933 | A | * | 7/1999 | Kaehr | 29/402.08 |
| 6,116,170 | A | * | 9/2000 | Yamada et al. | 110/233 |
| 6,244,195 | B1 | * | 6/2001 | Yang | 110/248 |
| 6,324,999 | B1 | * | 12/2001 | Maejima | 110/225 |
| 6,401,632 | B1 | | 6/2002 | Kaehr | |

* cited by examiner

*Primary Examiner*—Kenneth Rinehart
(74) *Attorney, Agent, or Firm*—John Wiley Horton

(57) ABSTRACT

An animal carcass incinerator designed to subject the entire external surface of the biomass material simultaneously to flame. The flame front burns inward toward the core of the material, greatly accelerating the burning process. Complete flame coverage of the biomass material is achieved by carefully shaping the internal surfaces of the incinerator. Burning gases are injected into a lower flame chamber. This lower flame chamber is bounded on its upper side by a grate, and on its remaining sides by the walls of the incinerator. Above the grate is a biomass chamber, where the animal carcasses or similar waste are deposited for incineration. The incinerator walls are lined with refractory insulating materials which incorporate a series of vertical flame channels. Likewise, the grate incorporates a series of vertical open channels. These channels are separated by raised ribs, which prevent the biomass materials from closing off the channels. The result is that even when the incinerator is jammed full of biomass materials, the burner flames still spread evenly around the entire external surface of the materials. A supplemental blower injects air to create a swirling pattern of flame within the biomass chamber.

13 Claims, 8 Drawing Sheets

ANIMAL CARCASS INCINERATOR

Matter enclosed in heavy brackets [ ] appears in the original patent but forms no part of this reissue specification; matter printed in italics indicates the additions made by reissue.

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

1. Field of the Invention

This invention relates to the field of waste disposal. More specifically, the invention comprises an incinerator capable of incinerating biomass materials such as animal carcasses and the like.

2. Description of the Related Art

Incinerators in general, and organic waste incinerators in particular, have been in widespread use for decades. A typical example is shown in U.S. Pat. No. 5,699,745 to Kaehr (1997). The Kaehr device uses an insulation-lined steel drum. As shown in FIG. 5, the general configuration has a gas burner on one end (24) and an exhaust stack on the other end (26).

A loading hatch is provided to load the biomass materials. The reader will observe—particularly in FIG. 8—that the biomass material tends to burn in a linear fashion (from one end to the other). The Kaehr device does not employ a grate, since prior art grates tend to deteriorate. Instead, it simply lets the residue fall to the bottom of the combustion chamber.

Similar devices are disclosed in U.S. Pat. No. 4,000,705 to Raber (1977), U.S. Pat. No. 5,799,597 to Kaehr (1998), and U.S. Pat. No. 5,926,933 to Kaehr (1999). The incinerators shown in these patents are representative of the prior art. The most significant aspect of these devices is that the biomass materials tend to burn in a linear fashion. The flame is located on one side of the material and the exhaust on the other. The biomass material begins burning on the side facing the flame, and the flame front progresses through the material.

The linear burning approach represents a limitation of the prior art. Much of the biomass material lies smoldering until the flame front reaches it. Thus, the prior art devices are slow. They also tend to produce incomplete combustion, resulting in excessive waste products. One approach to this problem has been to recombust the exhaust products (see U.S. Pat. No. 5,699,745), but this approach adds considerable complexity. A faster incinerator is certainly desirable.

Accordingly, the prior art devices are limited in that they:

1. Provide a relatively slow combustion process;
2. Require a multi-stage combustion process, adding considerable complexity; and
3. Burn the biomass materials in a linear fashion.

BRIEF SUMMARY OF THE INVENTION

The present invention burns the entire external surface of the biomass material simultaneously. The flame front burns inward toward the core of the material, greatly accelerating the burning process.

Complete flame coverage of the biomass material is achieved by carefully shaping the internal surfaces of the incinerator. Burning gases are injected into a lower flame chamber. This lower flame chamber is bounded on its upper side by a grate, and on its remaining sides by the walls of the incinerator. Above the grate is a biomass chamber, where the animal carcasses or similar waste are deposited for incineration.

The incinerator walls are lined with refractory insulating materials. The walls incorporate a series of vertical flame channels. Likewise, the grate incorporates a series of vertical open channels. These channels are separated by raised ribs, which prevent the biomass materials from closing off the channels. The result is that even when the incinerator is jammed full of biomass materials, the burner flames still spread evenly around the entire external surface of the materials. A supplemental blower injects air to create a swirling pattern of flame within the biomass chamber, thereby covering the top portions of the biomass material.

Accordingly, the present invention provides an animal carcass incinerator which:

1. Rapidly combusts biomass material;
2. Uses a single stage combustion process; and
3. Envelops the entire external surface of the biomass material in flame.

REFERENCE NUMERALS IN THE DRAWING

| | | | |
|---|---|---|---|
| 10 | frame | 12 | shell |
| 14 | burner | 16 | exhaust stack |
| 18 | main hatch | 20 | counterweight |
| 22 | main hatch hinge | 24 | blower |
| 26 | blower intake | 28 | burner intake |
| 30 | clean-out hatch | 32 | clean-out hinge |
| 34 | blower duct | 36 | burner jet |
| 38 | grate | 40 | flame channel |
| 42 | insulation | 44 | grate notch |
| 46 | flame circulation | 48 | exhaust flow |
| 50 | burner plume | 52 | lower flame chamber |
| 54 | biomass chamber | 56 | grate channel |
| 58 | air stream | | |

DETAILED DESCRIPTION OF THE INVENTION

Figure 1:
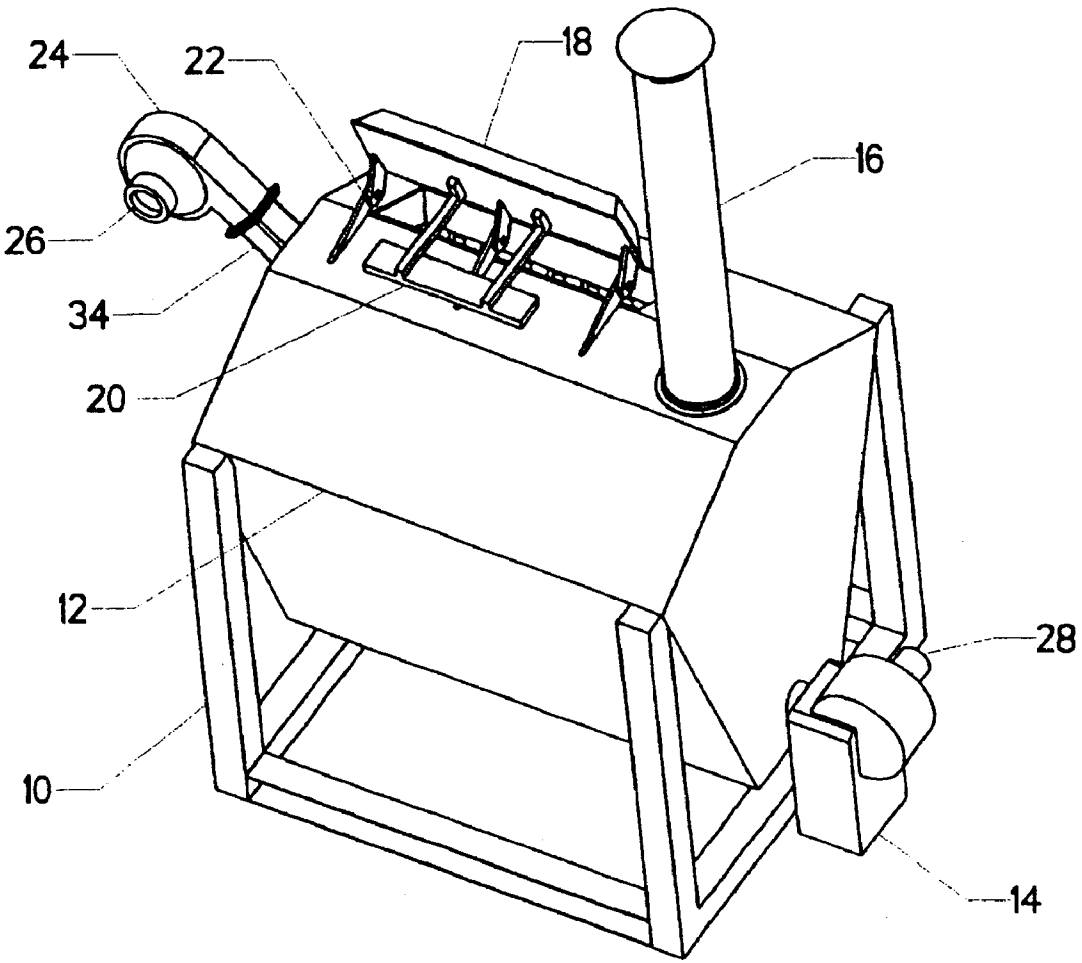
FIG. 1 is an isometric view, showing the proposed invention.

FIG. 1 shows the invention's primary external features. It consists of a hollow steel shell 12 supported by a generally rectangular frame 10. Burner 14 is placed at one end of shell 12, and exhaust stack 16 is placed immediately adjacent the same end. Burner 14 is typically of the gas (commonly propane or methane) or fuel oil type. It features an integral blower which pulls in ambient air through blower intake 28.

Main hatch 18 provides access to the interior of shell 12. As main hatch 18 is heavy, it is provided with counterweight 20 to hold it in the open position as shown. Main hatch 18 is attached to shell 12 by main hatch hinge 22.

Blower 24 is attached to shell 12 by blower duct 34. Blower 24 pulls in ambient air through blower intake 26 and injects it into the interior of shell 12.

Figure 2:
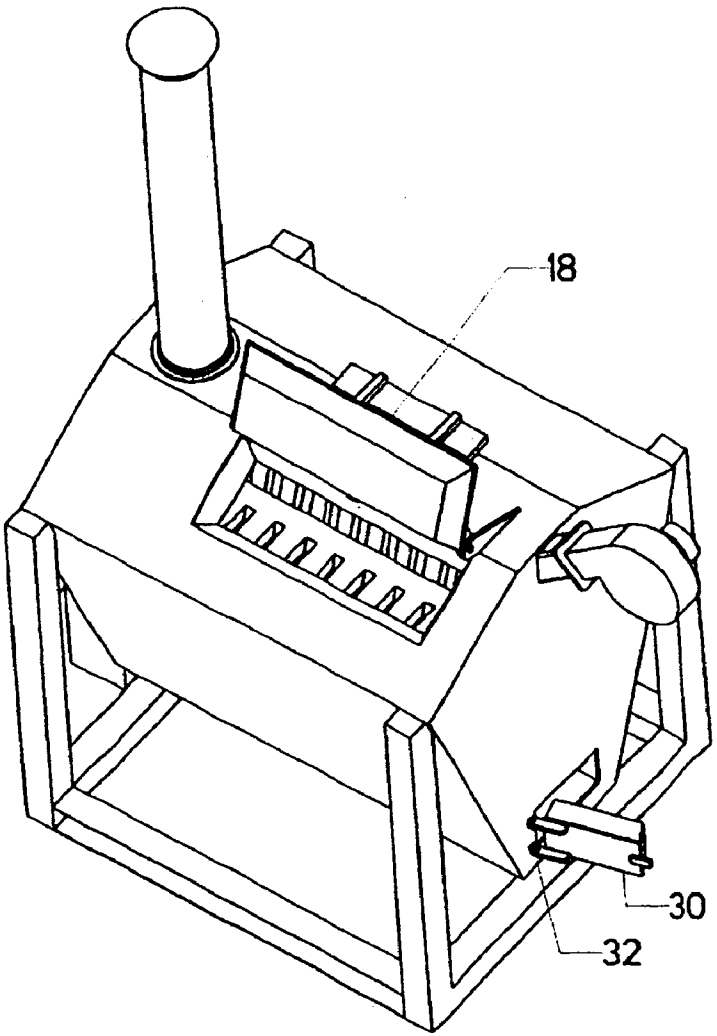
FIG. 2 is an isometric view, showing the proposed invention from another angle.

FIG. 2 shows the invention from another angle. The reader will observe that the end of shell 12 which is opposite burner 14 is equipped with clean-out hatch 30. Clean-out hatch 30 is attached to shell 12 by clean-out hinge 32. The purpose of clean-out hatch 30 is to allow the user to remove the residual ash after the incineration process is complete. Obviously, when burner 14 is operating, clean-out hatch 30 must be dogged shut.

FIG. 2 also shows a better view of main hatch 18. It is necessary to heavily insulate the steel walls of shell 12. Otherwise, the incineration process would burn through the walls. Thus, as will be described in more detail subsequently, shell 12 is lined with thick insulation. The reader will observe that the swinging lid on main hatch 18 consists of a piece of plate with an attached piece of insulation. The side walls of the insulation must be tapered so that they fit within the corresponding taper cut into the insulation inside shell 12. The same is true for clean-out hatch 30. As this approach is well known in the prior art, it will not be described in greater detail.

Figure 3:
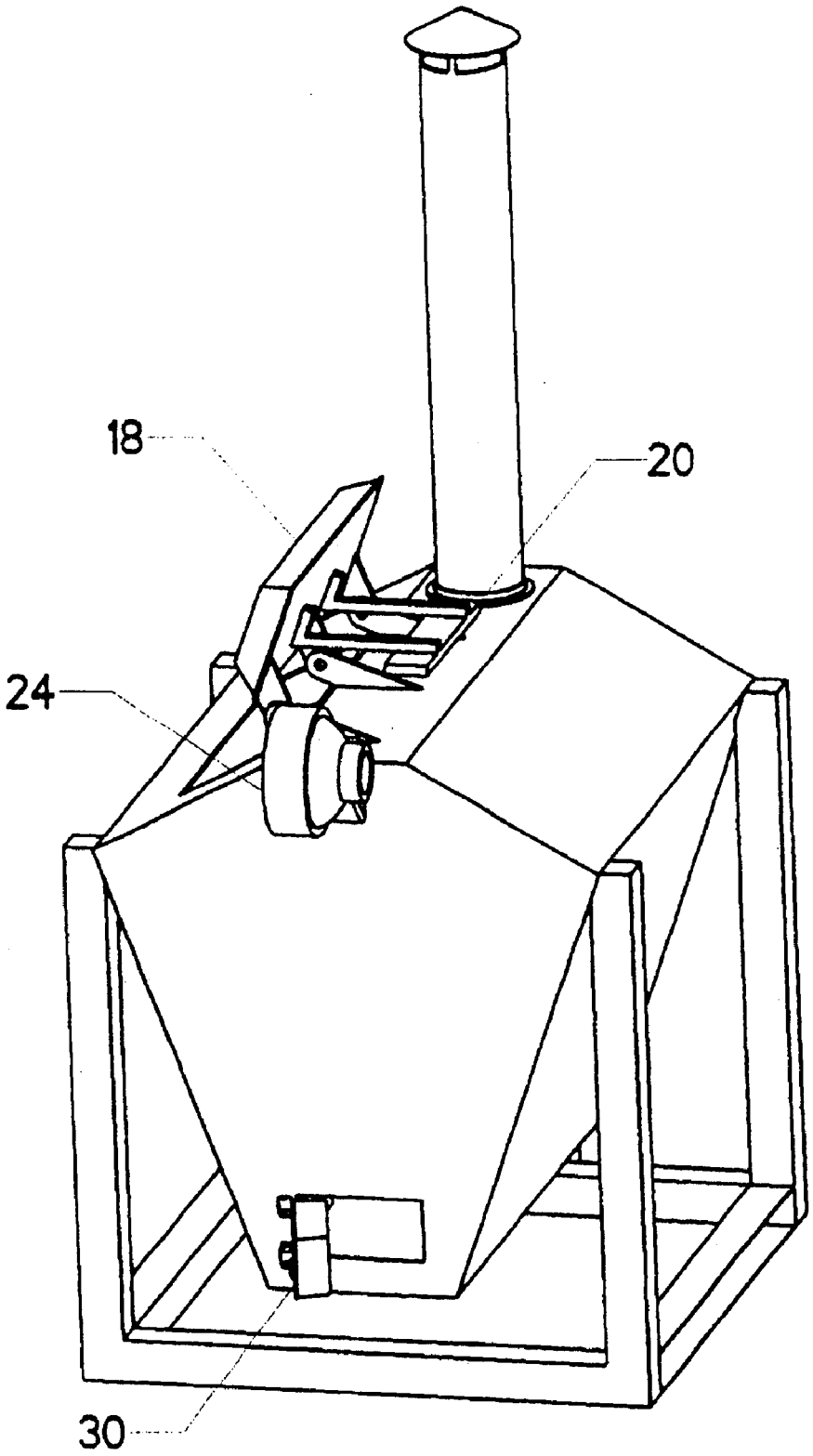
FIG. 3 is an isometric view, showing the proposed invention from still another angle.

FIG. 3 shows the invention from the side opposite the burner. In this view, the reader will observe how counterweight 20 tends to hold open hatch 18 once it has swung near its fully open position. Hatch 18 will remain in this position until the user rotates it closed again. FIG. 3 also shows how clean-out hatch 30 provides ready access to the lower portion of the interior of shell 12. A user can insert a rake or small hoe through this opening and pull the ashes remaining from the incineration process out.

Figure 4:
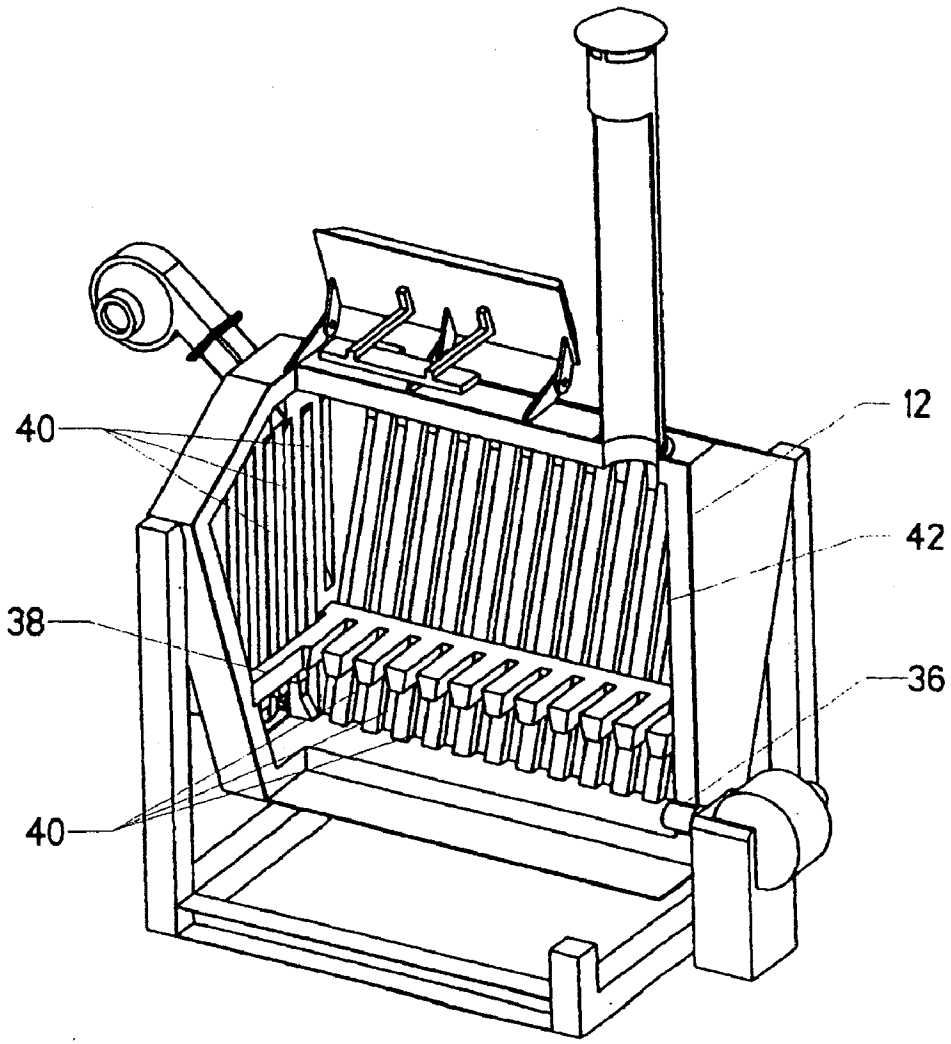
FIG. 4 is an isometric view with a cutaway, showing some internal features.

FIG. 4 employs a cutaway to reveal some internal features of the device. The reader will observe the thin-walled nature of shell 12. Also apparent is the relative thickness of insulation 42. Grate 38 is placed in a horizontal plane within the lower portion of shell 12's interior. In order to aid visualization, the cutaway is carried through shell 12, insulation 42, grate 38, and exhaust stack 16.

The interior surfaces of insulation 42 are not smooth. Instead, they are molded into a corrugated shape. A series of flame channels 40 extend up the side walls (including the side wall which is cut away in the view). A series of flame channels 40 also extend up the interior surface of the end wall shown (the end opposite burner jet 36). There are, however, no flame channels on the wall in which burner jet 36 is mounted.

Figure 4B:
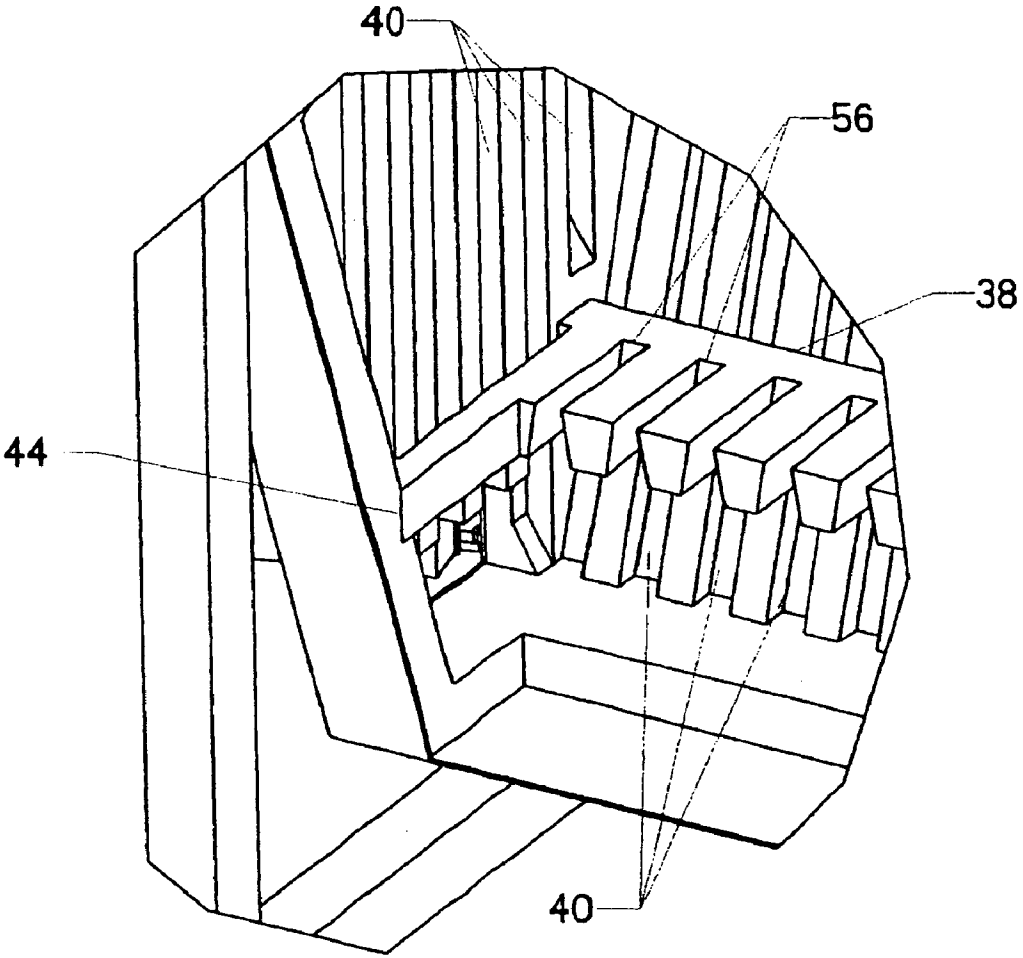
FIG. 4B is a detail view, showing the arrangement of the flame channels.

FIG. 4B shows the flame channels in greater detail. The reader will observe that grate 38 is pierced by a series of grate channels 56. These allow flames to pass from beneath grate 38 up to the biomass sitting on top. Likewise, the side wall shown is cut by a series of flame channels 40. The same is true for the end wall (in the left of the view). The lower portion of the end wall opens into clean-out hath 30 (shown just below grate 38). It is important to recall that grate 38 is shown with a cutaway; i.e., it normally extends completely across the bottom region of shell 12. Grate notch 44 is cut into the interior walls of insulation 44. Grate 38 fits snugly within grate notch 44, with gravity holding it in place.

Figure 5:
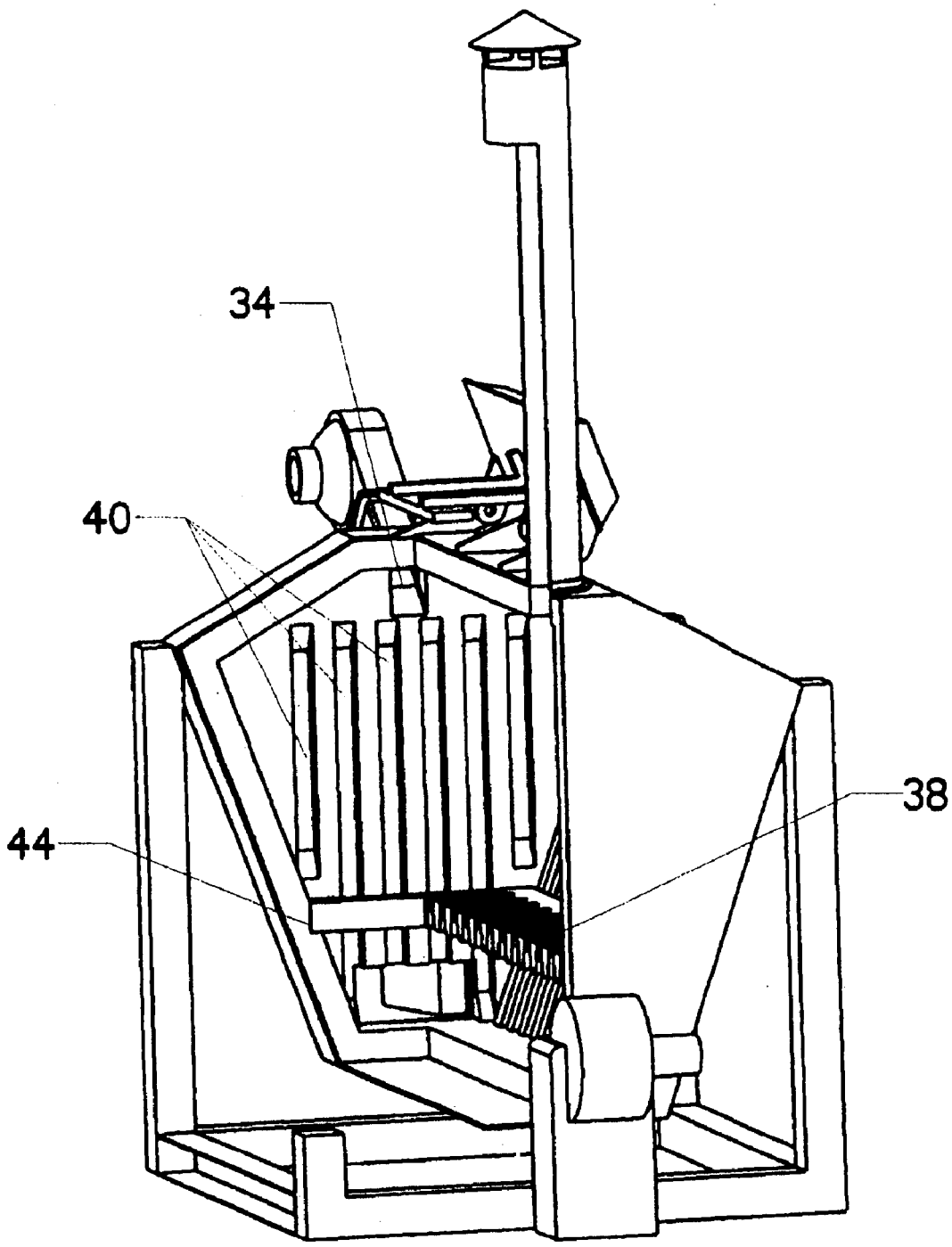
FIG. 5 is an isometric view with a cutaway, showing more internal features.

FIG. 5 better illustrates the interior surfaces of the wall opposite the burner. The series of vertical flame channels 40 are apparent. As is the case with the side walls, the flame channels begin below grate 38 and extend well up into the interior of shell 12. The inner surface of the insulation is solid between each flame channel, forming in effect a rib. The result is that the biomass materials within the incinerator will not be able to occlude the flame channels.

Figure 6:
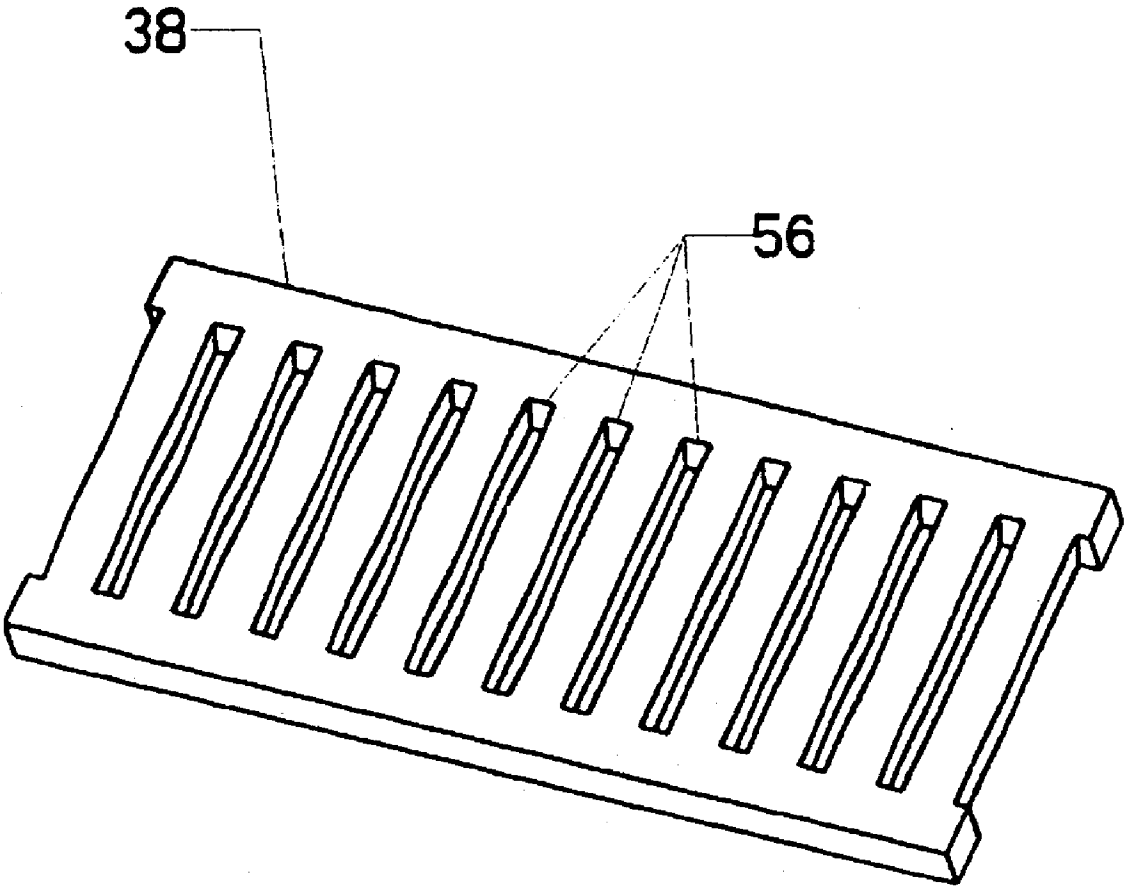
FIG. 6 is an isomeric view, showing the grate.

FIG. 6 shows grate 38 standing alone (without the cutaway). The reader will in this view more readily observe the shape of grate channels 56.

Figure 7:
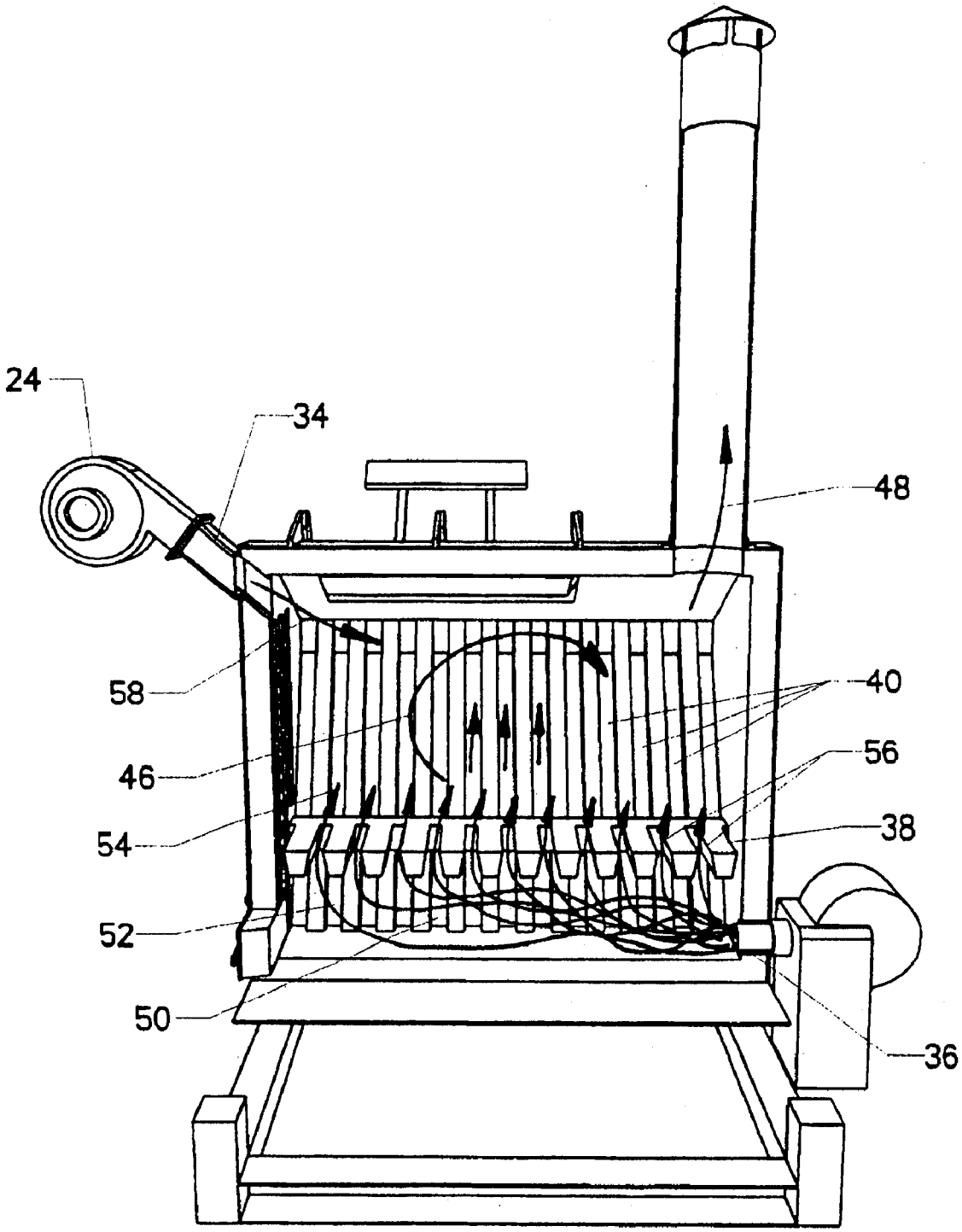
FIG. 7 is a perspective view with cutaways, showing the operation of the invention.

FIG. 7 is a perspective view with the entire shell and insulation cut in half in order to illustrate its internal operation. Grate 38 divides the interior into lower flame chamber 52 and upper biomass chamber 54. When burner jet 36 is turned on, burner plume 50 erupts across lower flame chamber 52. The flames then shoot upward through grate channels 56. The flames also shoot up the walls through flame channels 40. The bottom of the biomass material is exposed to flame through grate channels 56. The sides of the biomass material are exposed to flames extending outward from flame channels 40. Without more, however, the top of the biomass material would be relatively unexposed.

Blower 24 is added to remedy this problem. Blower 24 injects air stream 58 through blower duct 34. This jet of air tends to produce flame circulation 46. Thus, the flames tend to roll over the top of the biomass material, thereby completing a continuous envelope of flame. After rolling over the top, the spent combustion gases then rush out as exhaust flow 48.

Placing exhaust stack 16 on the same side as burner 14 is a significant feature in the device's operation. Likewise, the provision of flame channels 40 in its interior walls and grate channels 56 in grate 38 combine to completely envelop the biomass material in flame. The result is that the material is burning simultaneously on all sides. It is therefore consumed much more rapidly than would be the case if its is burned from one end to the other. In addition, since no part of the biomass is left to smolder at relatively low temperature, the production of offensive odors is greatly reduced.

Accordingly, the reader will appreciate that the proposed invention provides an animal carcass incinerator which:

1. Rapidly combusts biomass material;
2. Uses a single stage combustion process;
3. Envelops the entire external surface of the biomass material in flame; and
4. Reduces the emission of offensive odors.

Although the preceding description contains significant detail, it should not be construed as limiting the scope of the invention but rather as providing illustrations of the preferred embodiment of the invention. Thus, the scope of the invention should be fixed by the following claims, rather than by the examples given.

Having described my invention, I claim:

1. An incinerator for burning animal carcasses, comprising:

a. an insulated shell including an inner surface and an outer surface;

b. a grate, placed horizontally within said insulated shell, so as to divide a space enclosed within said insulated shell into a lower flame chamber and an upper biomass chamber;

c. means for introducing said animal carcasses into said upper biomass chamber;

d. a burner placed at a first end of said insulated shell and beneath said grate;

e. an exhaust stack placed proximate said first end of said insulated shell and positioned so as to vent said upper biomass chamber to a surrounding atmosphere; and f. a plurality of channels cut into said inner surface of said insulated shell, wherein said channels are positioned to direct a flame produced by said burner evenly around said inner surface of said shell as said flame proceeds from said lower flame chamber, into said upper biomass chamber, around said animal carcasses, and out said exhaust stack.

2. A device as recited in claim 1 further comprising a blower placed proximate a second end of said insulated shell, and oriented to direct a stream of air against said flame so as to roll said flame over said animal carcasses.

3. A device as recited in claim 1, wherein a second end of said insulated shell opens into a clean out door, with said door being positioned beneath said grate, and wherein said clean-out door is large enough to allow the removal of waste products from said lower flame chamber.

4. A device as recited in claim 1, wherein said grate includes a series of vertical grate channels which allow the passage of said flame from said lower flame chamber to said upper biomass chamber through said grate.

5. A device as recited in claim 1, wherein said means for introducing said animal carcasses into said upper biomass chamber comprises a main hatch opening through said insulated shell, with said main hatch being large enough to admit said animal carcasses.

*6. An incinerator for burning animal carcasses, comprising:*

*a. an insulated shell including an inner surface and an outer surface, having a first end and a second end;*

*b. a grate, placed horizontally within said insulated shell, so as to divide a space enclosed within said insulated shell into a lower flame chamber and an upper biomass chamber;*

*b. means for introducing said animal carcasses into said upper biomass chamber;*

*d. a burner placed at said first end of said insulated shell and beneath said grate;*

*e. an exhaust stack placed proximate said first end of said insulated shell and positioned so as to vent said upper biomass chamber to a surrounding atmosphere; and*

*f. a blower, positioned proximate said second end of said insulated shell, and oriented to direct a stream of air downward and toward said first end of said insulated shell.*

*7. An incinerator as recited in claim 6, wherein said second end of said insulated shell opens into a clean out door, with said clean out door being positioned beneath said grate, and wherein said clean out door is large enough to allow the removal of waster products from said lower flame chamber.*

*8. An incinerator as recited in claim 6, wherein said grate includes a series of vertical grate channels which allow the passage of said flame from said lower flame chamber to said upper biomass chamber through said grate.*

*9. An incinerator as recited in claim 6, wherein said means for introducing said animal carcasses into said upper biomass chamber comprises a main hatch opening through said insulated shell, with said main hatch being large enough to admit said animal carcasses.*

*10. An incinerator for burning animal carcasses, comprising:*

*a. an insulated shell including an inner surface and an outer surface, having a first end and a second end;*

*b. a grate, placed horizontally within said insulated shell, so as to divide a space enclosed within said insulated shell into a lower flame chamber and an upper biomass chamber;*

*c. means for introducing said animal carcasses into said upper biomass chamber;*

*d. a burner placed at said first end of said insulated shell and beneath said grate, so that a flame produced by said burner travels through said lower flame chamber and through said grate into said upper biomass chamber;*

*e. an exhaust stack placed proximate said first end of said insulated shell and positioned so as to vent said upper biomass chamber to a surrounding atmosphere; and*

*f. a blower, positioned proximate said second end of said insulated shell, and oriented to direct a stream of air against said flame so as to roll said flame over said animal carcasses.*

*11. An incinerator as recited in claim 10, wherein said second end of said insulated shell opens into a clean out door, with said clean out door being positioned beneath said grate, and wherein said clean out door is large enough to allow the removal of waster products from said lower flame chamber.*

*12. An incinerator as recited in claim 10, wherein said grate includes a series of vertical grate channels which allow the passage of said flame from said lower flame chamber to said upper biomass chamber through said grate.*

*13. An incinerator as recited in claim 10, wherein said means for introducing said animal carcasses into said upper biomass chamber comprises a main hatch opening through said insulated shell, with said main hatch being large enough to admit said animal carcasses.*

* * * * *